I. V. BENOIT.
AUTOMOBILE TIRE CHAIN.
APPLICATION FILED APR. 2, 1918.
1,363,175.
Patented Dec. 21, 1920.
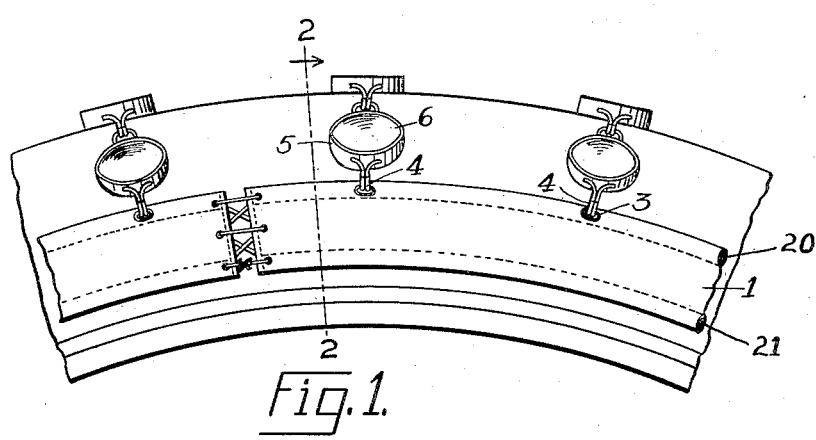
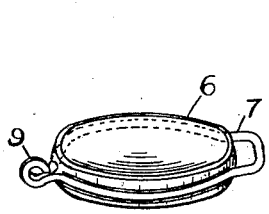
Fig. 3.
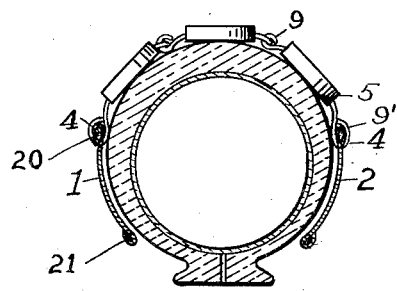
Fig. 2.
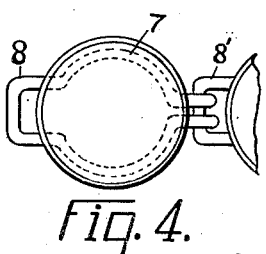
Fig. 4.
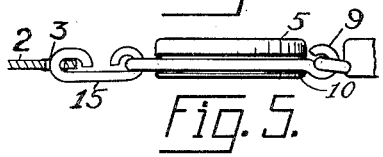
Fig. 5.
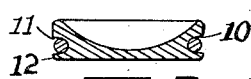
Fig. 6.
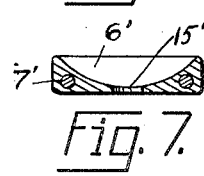
Fig. 7.
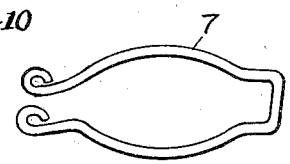
Fig. 8.
INVENTOR
IDA V. BENOIT.
BY
Herbert H. Thompson
ATTORNEY

UNITED STATES PATENT OFFICE.

IDA V. BENOIT, OF BROOKLYN, NEW YORK.

AUTOMOBILE-TIRE CHAIN.

1,363,175. Specification of Letters Patent. Patented Dec. 21, 1920.

Application filed April 2, 1918. Serial No. 226,150.

*To all whom it may concern:*

Be it known that I, IDA V. BENOIT, a citizen of the United States of America, residing at 1004 Bergen street, Brooklyn, in the county of Kings and State of New York, have invented certain new and useful Improvements in Automobile-Tire Chains, of which the following is a specification.

This invention relates to anti-skid devices for automobiles wherein a detachable chain or the like having transversely extending portions is fitted around a tire on the vehicle.

One of the objects of my invention is to improve upon the chain structure whereby a better gripping of the surface of the roadway is obtained without sacrificing the strength and wearing qualities of the ordinary link-chain construction.

Another object of my invention is to eliminate the troublesome circumferentially extending or side chains, replacing them by fabric members which at once serve to protect the sides of the tire which are generally much thinner and more liable to puncture than the tread, and as an anchor for either side of the chain links extending across the tread.

Referring to the drawings, in which what I now consider to be the preferred form of my invention is illustrated:

Figure 1 is an elevation of a portion of an automobile tire showing my invention applied thereto.

Fig. 2 is a section through the tire on line 2—2 Fig. 1.

Fig. 3 is a perspective view of one of the cup members forming a link of the cross chain.

Fig. 4 is a bottom plan view of one of the links or cups.

Fig. 5 is a side elevation of the same with the connecting links attached thereto.

Fig. 6 is a vertical section of the same showing one method of constructing the cup.

Fig. 7 is a similar section showing a slightly different construction in which the reinforcing or connecting wire is embedded in the body of the cup.

Fig. 8 is a perspective view of the reinforcing wire used in my invention before it is crimped around the cup.

My tire chain as shown comprises a plurality of circumferentially extending members 1 and 2, which are preferably constructed of fabric or other flexible, fibrous material so as to closely fit the sides of the tire as indicated in Fig. 2.

The strips are preferably of heavy material and curved to fit the tire snugly so that when applied they will act as anchor members on either side of the tire for the transversely extending tread portions. The strips may be padded or reinforced at either edge, 20 or 21 if desired. Each strip is shown as provided with a plurality of eyelets 3 or the like through which are hooked the adjacent hooks 9 of the link members.

As stated hereinbefore I prefer to construct the links in the form of cups 5 in order to secure the maximum traction. Said cups are shown as formed with a body portion 6 which may be of cast metal, tough fiber, or any suitable wear resisting material. Partially embedded or secured within and preferably forming a part of said cup is a reinforcing wire 7. Said wire is shown as extending around the cup near its outer edge or thicker portion and projects at each side to form an attaching member for the next link. Preferably at one side the wire is formed into an eye 8 while at the opposite side the two free ends of the wire are bent to form a hook 9 which engages the eye 8' of the adjacent link. I am aware that it has been proposed to employ cup-shaped members as tread links for tire chains but in all prior constructions of such links of which I am aware the attaching means for the adjacent links such as the hooks and eyes were cast or formed as a part of the body of the cup with the result that greatly weakened portions were presented at the points of attachment between the hooks or eyes and the cups. According to my invention, however, the cup member possesses the same tensile strength throughout since all strains are borne by the wire 7. This being the case, a material may be adapted for the cup itself substantially without regard for its tensile strength and mainly with reference to its wearing and gripping qualities and toughness. The cups are designed to be placed on the tires with their plain surface against the tire and their concave surface away from the tire as shown. The cup may, if desired, be formed with a hole 15' through the center so that the cup is in the form of an annulus or ring as shown in Fig. 7. The wire may be either cast or molded into the body of the cup as indicated in Fig. 7 or a groove 10 may be formed in the periphery of the cup in which the wire is placed. The wire may then be secured in place by turning over one or both edges 11 and 12 of the groove or by crimping the wire tightly at each end or otherwise. The end link may be formed with a hook 9 and 9' at each end so as to be taken into the eyelet 3 in strip 2 as illustrated in Fig. 2, or it may be formed as the other link and a short double hook member 15 may be provided for said purpose as indicated in Fig. 5.

Having described my invention, what I claim and desire to secure by Letters Patent is:

1. The combination with a vehicle tire, of a circumferentially extending member for each side of the tire, and a plurality of transverse tread members connecting said circumferential members, each of said tread members comprising a plurality of cups having a wire embedded therein adjacent its edge and forming an attachment at either side.

2. A tread link for vehicle tire-chains comprising a cup like member, a wire secured therein around the edge thereof and protruding at either side of the member, said wire being adapted to form an attaching means for the adjacent link at each side.

3. A tread link for vehicle tire-chains comprising a cup like member, a wire embedded therein, the central portion of the wire protruding to form an eye and the ends protruding at the opposite side to form a hook.

4. The combination with a vehicle tire, of a circumferentially extending fabric member for each side of and adapted to closely fit the tire, eyelets formed therein and metallic link members engaging said eyelets connecting said members and forming tread links for the tire.

5. A tread link for vehicle tire-chains, comprising a cup-like member, a wire molded and embedded therein, said wire being adapted to be attached at either side of the cup to an adjacent link.

6. A tread link for vehicle tire chains comprising a member substantially flat on one side and cup-shaped on the other side, a wire secured around the edge thereof and protruding from either side of the member, said wire being adapted to form the attaching means for the adjacent link on each side.

In testimony whereof I have affixed my signature.

IDA V. BENOIT.